United States Patent
Takebe et al.

(10) Patent No.: US 6,853,295 B2
(45) Date of Patent: Feb. 8, 2005

(54) VEHICULAR CONTROL UNIT WITH SELF SHUT-OFF FUNCTION AND ABNORMALITY DETECTION FUNCTION

(75) Inventors: Kiminobu Takebe, Nagoya (JP); Masatoshi Akanuma, Kanagawa (JP); Satoshi Takizawa, Yokohama (JP)

(73) Assignee: JATCO Ltd, Fuji (JP)

( * ) Notice: Subject to any disclaimer, the term of this patent is extended or adjusted under 35 U.S.C. 154(b) by 81 days.

(21) Appl. No.: 10/419,991

(22) Filed: Apr. 22, 2003

(65) Prior Publication Data

US 2004/0012503 A1 Jan. 22, 2004

(30) Foreign Application Priority Data

Apr. 25, 2002 (JP) ........................................ 2002-124732

(51) Int. Cl.$^7$ ............................................. B60R 25/10
(52) U.S. Cl. ................ 340/426.11; 340/663; 340/635; 340/660; 361/92; 713/300
(58) Field of Search .......................... 340/426.11, 660, 340/661, 663, 635, 636.1; 361/88, 90, 92; 323/234, 282; 701/1, 36, 29, 51, 21, 23; 713/300, 330

(56) References Cited

U.S. PATENT DOCUMENTS

| | | | | |
|---|---|---|---|---|
| 4,951,171 A | * | 8/1990 | Tran et al. | ..................... 361/90 |
| 4,962,543 A | * | 10/1990 | Kuge et al. | ................. 455/574 |
| 5,578,950 A | * | 11/1996 | Kolanko et al. | ............ 327/110 |
| 6,188,259 B1 | | 2/2001 | Amir et al. | ................. 327/198 |
| 6,486,718 B1 | * | 11/2002 | Stelle et al. | ................ 327/198 |

* cited by examiner

Primary Examiner—Phung Nguyen
(74) Attorney, Agent, or Firm—Foley & Lardner LLP

(57) ABSTRACT

In a vehicular control unit, a main power supply voltage detecting section to detect a voltage value of a main power supply is provided and, an abnormality determining section determines an abnormality occurs in the main power supply voltage detecting section when the main power supply voltage detecting section negatively detects the voltage value of the main power supply and a power supply stop command output section outputs a command to stop the supply of the continuous power supply to the power supply control circuit without an execution of a shut-off process when the abnormality determining section determines that the abnormality occurs in the main power supply voltage detecting section.

10 Claims, 4 Drawing Sheets

VEHICULAR CONTROL UNIT WITH SELF SHUT-OFF FUNCTION AND ABNORMALITY DETECTION FUNCTION

BACKGROUND OF THE INVENTION

1. Field of the Invention

The present invention relates to a vehicular control unit with a self shut-off function and abnormality (or malfunction) detection function in which, even if a self shut-off of a power supply cannot be carried out due to an occurrence of abnormality in the self shut-off function, a power supply turn off (interruption) of the control unit can be carried out without failure.

2. Description of the Related Art

A previously proposed self shut-off function with which each of an engine control unit (ECU), an automatic transmission control unit (ATCU), or any other vehicular control units is provided will be described below. A CPU (Central Processing Unit) of such a control unit as described above receives a power supply voltage (bias voltage) Vcc via a power supply control circuit from an auxiliary ignition power supply which is an auxiliary power supply when an ignition key switch is turned on. When the ignition key switch is turned to OFF and a voltage terminal ($E_2$) of a power supply circuit via which the voltage from the ignition power supply is supplied to the power supply control circuit is turned to be a low level (Low), the same low level voltage is inputted into an A/D conversion input of the CPU. At this time, the CPU starts a self shut-off operation when the A/D conversion input is at the low level. At this time, a battery power supply as a continuous power supply is supplied to the power supply control circuit in place of the auxiliary ignition power supply.

First, CPU executes a shut-off process in which a system operation information is written onto a rewritable nonvolatile memory such as EEPROM (Electrically Erasable Programmable Read Only Memory). Next, the CPU turns a voltage of terminal $E_1$ of the power supply control circuit which is normally at a high level (Hi) to the low level (Low) so that a power down enable signal is outputted to the power supply control circuit. The power supply control circuit, upon receipt of the power down enable signal, stops the power supply voltage (Vcc) to the CPU. Thus, the CPU stops its run due to the interruption of the power supply voltage (Vcc) and, simultaneously, the self shut-off is terminated.

SUMMARY OF THE INVENTION

In the vehicular control unit having the self shut-off function described above, an A/D converter incorporated into the CPU often fails due to a faulty semiconductor (or semiconductor malfunction) or electrical stress (surge or static electricity) thereon. In this case, even if the ignition key switch is turned to OFF and A/D conversion input portion of the CPU is turned to the low level (Low), the CPU cannot detect the information described above and continues a given control main process.

Hence, the CPU does not output a power down enable signal to a power supply control circuit even if the ignition key switch is turned off. The power supply to the CPU is not turned off (continued to be supplied). Hence, a disconnection of the CPU via a connection terminal from the power supply is needed or a forceful interruption of the main power supply is needed, in order to forcefully stop running the CPU.

It is, therefore, an object of the present invention to provide vehicular control unit with a self shut-off function and an abnormality detecting function in which, even if the above-described abnormality occurs in the self shut-off function so that the self shut-off process cannot be made, the power supply turn off to the control unit can be achieved without failure.

The above-described object can be achieved by providing a vehicular control unit with a self shut-off function and an abnormality detection function, comprising: a main power supply voltage detecting section to detect a voltage value of a main power supply; a self shut-off controlling section that executes a shut-off process upon receipt of a supply of a continuous power supply from a power supply control circuit and, thereafter, stops the supply of the continuous power supply, when the detected voltage value of the main power supply is equal to or lower than a preset value with an ignition key switch turned off, the self shut-off controlling section comprising: an abnormality determining section that determines an abnormality occurs in the main power supply voltage detecting section when the main power supply voltage detecting section negatively detects the voltage value of the main power supply; and a power supply stop command output section that outputs a command to stop the supply of the continuous power supply to the power supply control circuit without an execution of the shut-off process when the abnormality determining section determines that the abnormality occurs in the main power supply voltage detecting section.

The above-described object can also be achieved by providing a method applicable to a vehicular control unit with a self shut-off function and an abnormality detection function, the vehicular control unit comprising a main power supply voltage detecting section to detect a voltage value of a main power supply, the method comprising: executing a shut-off process upon receipt of a supply of a continuous power supply from a power supply control circuit; stopping the supply of the continuous power supply, when the detected voltage value of the main power supply is equal to or lower than a preset value with an ignition key switch turned off; determining an abnormality occurs in the main power supply voltage detecting section when the main power supply voltage detecting section negatively detects the voltage value of the main power supply; and outputting a command to stop the supply of the continuous power supply to the power supply control circuit without the execution of the shut-off process when determining that the abnormality occurs in the main power supply voltage detecting section.

This summary of the invention does not necessarily describe all necessary features so that the invention may also be a sub-combination of these described features.

The other objects and features of the present invention will become understood from the following description with reference to the accompany drawings.

DETAILED DESCRIPTION OF THE PREFERRED EMBODIMENT

Reference will hereinafter be made to the drawings in order to facilitate a better understanding of the present invention.

Figure 1:
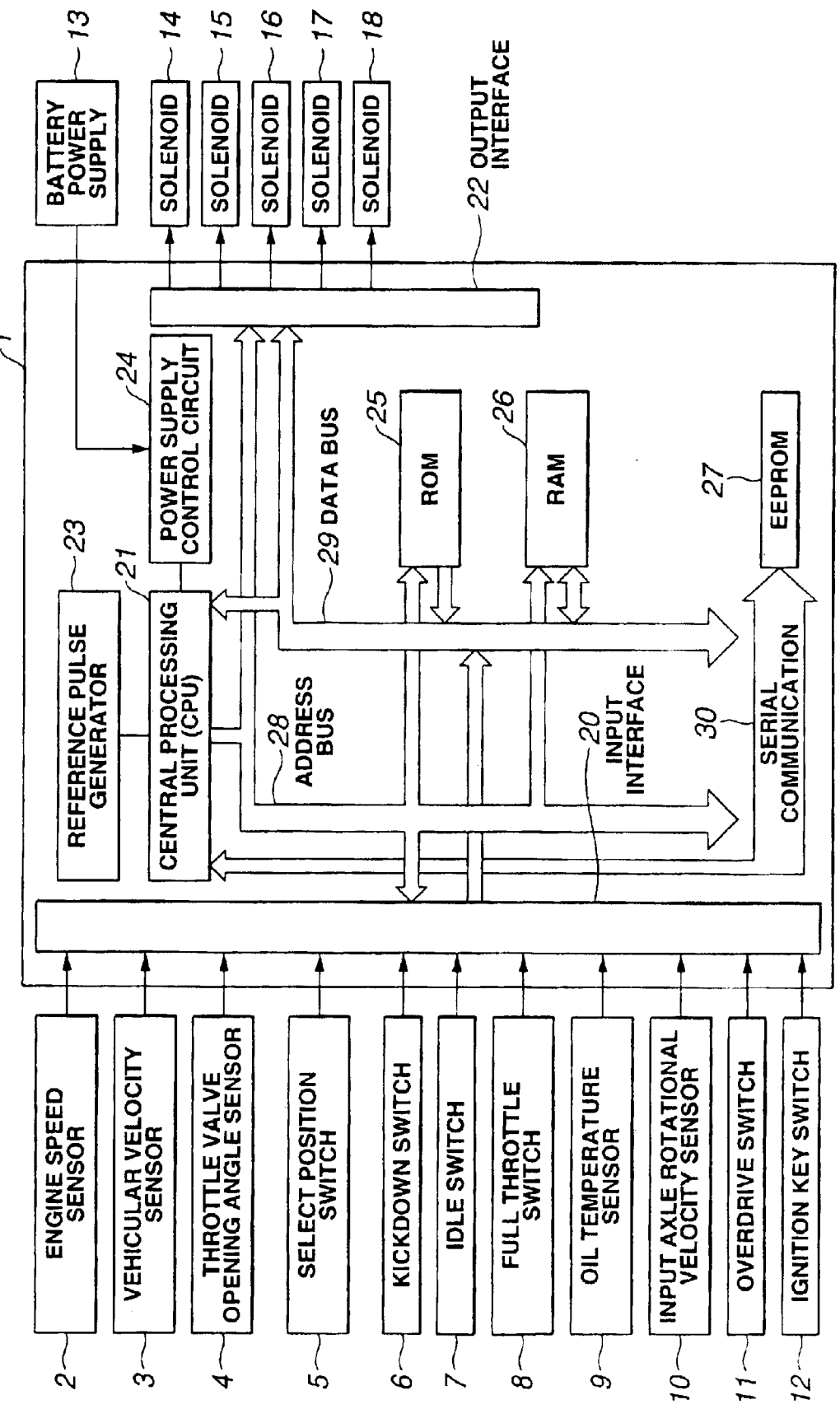
FIG. 1 is a circuit block diagram of a gear shift controlling apparatus to which a self shut-off abnormality detection apparatus in a preferred embodiment according to the present invention is applicable.

FIG. 1 shows a circuit block diagram of a gear shift controlling apparatus for a vehicular automatic transmission to which a vehicular control unit with a self shut-off function and abnormality detection function according to the present invention is applicable. In FIG. 1, a reference numeral 1 denotes an ATCU, a reference numeral 2 denotes an engine speed sensor, a reference numeral 3 denotes a vehicle speed sensor, a reference numeral 4 denotes a throttle opening sensor (or called, a throttle valve opening angle sensor), a reference numeral 5 denotes a select position button (or switch button), a reference numeral 6 denotes a kick down switch, a reference numeral 7 denotes an idle switch, a reference numeral 8 denotes a full throttle switch representing that the throttle valve is fully opened, a reference numeral 9 denotes an oil temperature sensor, a reference numeral 10 denotes an (transmission) input axle revolution speed sensor, a reference numeral 11 denotes an overdrive switch, a reference numeral 12 denotes an ignition key switch, a reference numeral 13 denotes a battery power supply, reference numerals 14, 15, 16, 17, and 18 denote solenoids, a reference numeral 20 denotes an input interface, a reference numeral 21 denotes a CPU (Central Processing Unit), a reference numeral 22 denotes an output interface, a reference numeral 23 denotes a reference pulse generator, a reference numeral 24 denotes a power supply control circuit, a reference numeral 25 denotes a ROM (Read Only Memory), a reference numeral 26 denotes a RAM (Random Access Memory), a reference numeral 27 denotes a EEPROM (Electrically Erasable Programmable Read Only Memory), a reference numeral 28 denotes an address bus, a reference numeral 29 denotes a data bus, and a reference numeral 30 denotes a serial communication line.

Sensor signals and switch signals from switch and sensor groups 2 through 12 are fetched into input interface 20 of ATCU 1 and are converted into digital signals for calculation process.

Battery power supply 13 is connected to CPU 21 via a power supply control circuit 24 of ATCU 1. A turn off state of ignition key switch 12 causes an ignition power supply to be interrupted and, thereafter, CPU 21 is operated by battery power supply 13 and battery power supply 13 is, at this time, used as a back-up power supply to rewrite the stored data in EEPROM 27 as will be described later. The above-described solenoids 14 through 18 serve as drive actuators to drive driven objects such as electromagnetic valves in accordance with in accordance with a command from an output interface 22 of ATCU 1. Specifically, solenoids 14 through 18 serve as drive actuators to drive driven objects such as valves in accordance with a command from output interface 22 of ATCU 1. Specifically, solenoids are constituted by, for example, shift solenoids (down-shift or up-shift solenoids) used for the gear shift control and a lock-up solenoid used for a line pressure control.

CPU 21 is a Central Processing Unit to arithmetically and logically process input data on the basis of a set control program. The data is transmitted from input interface 20, ROM 25, and RAM 26 to CPU 21 and output interface 22 via data bus 29. Addresses are transmitted from CPU 21 to input interface 20, output interface 22, ROM 25, and RAM 28. The data is supplied from CPU 21 to RAM 26 via an address bus 28. The data is supplied from CPU 21 to RAM 26 via a data bus 29 to RAM 26.

Furthermore, a serial communication line 30 is connected between a serial port of CPU 21 and a serial port of EEPROM 27 so that a bi-directional communication connection in which the data is aligned sequentially and is inputted and outputted. An A/D converter (not shown since it is incorporated into CPU 21) which converts the input voltage of battery power supply 13 into its digital value is connected between an internal circuit of CPU 21 and battery power supply 13. CPU 21 detects the voltage value of battery power supply 13 on the basis of the digital output value outputted from A/D converter.

ROM 25 is a memory device of read only memory which is incapable of writing additionally, erasing, and overwriting but whose memory contents are not extinguished (non-volatile) even if no power supply is given and the necessary data required in the control purpose are already stored. RAM 26 is erasable memory device when the power supply thereto is turned off so that the memory contents is erased. However, RAM 26 is a read/write memory device capable of reading and writing memory device by arbitrarily specifying an arbitrary address during the power supply and is used mainly as a working area of control program stored in ROM 25. EEPROM 27 is rewritable ROM whose memory contents are held even when the power supply thereto is interrupted and, when the ignition key switch is turned off and a shut-off process is executed, the system operation information is recorded without failure.

Next, an operation of the self shut-off abnormality detecting apparatus will be described below.

[Gear Shift Control Process]

Figure 2:
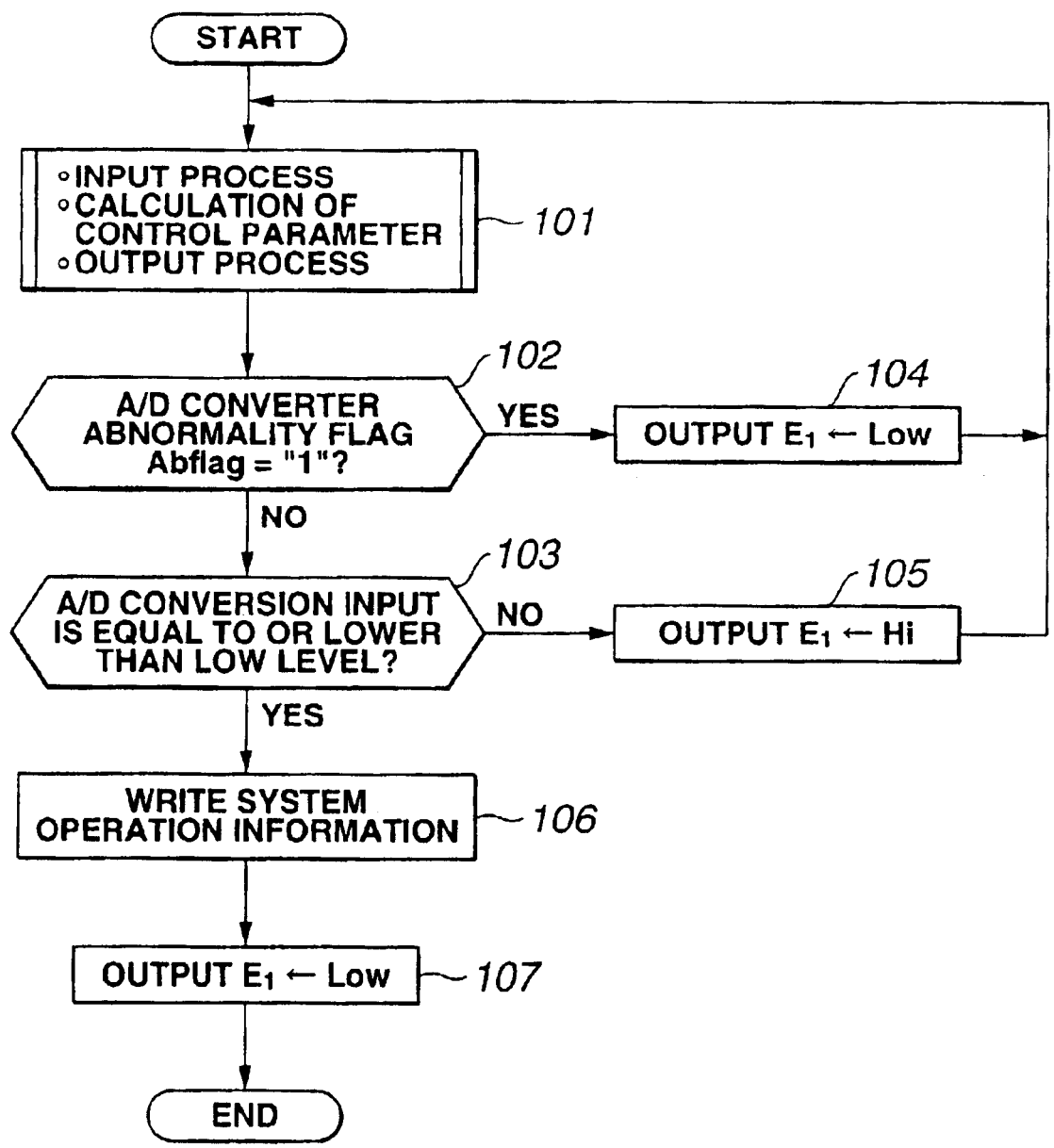
FIG. 2 is an operational flowchart representing a flow of a gear shift control process in the preferred embodiment according to the present invention.

FIG. 2 shows an operational flowchart representing a flow of a gear shift control process executed by CPU 21.

At a first step 101, CPU 21 performs an input processing, a control parameter calculation, and an output processing to perform a normal gear shift control.

Figure 4:
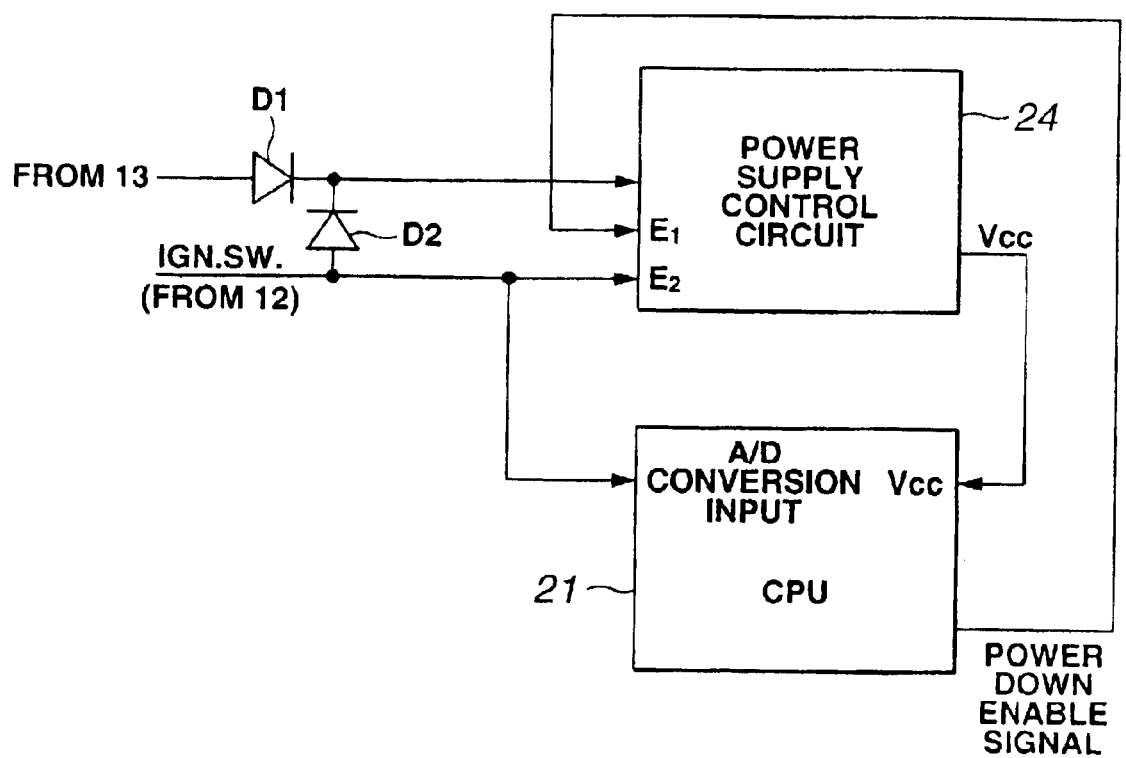
FIG. 4 is a circuit block diagram of a self shut-off function that a CPU of the self shut-off abnormality detection apparatus in the embodiment has.

At a step 102, CPU 21 determines whether an abnormality (failure, electrical stress, or malfunction) in the A/D converter occurs from a status of an A/D converter abnormality flag Abflag. At step 103, CPU 21 determines whether an A/D conversion input of CPU 21 is equal to or lower than a predetermined low level voltage (Low) (for example, 1.5V) in a circuit block diagram of FIG. 4. If the A/D conversion input thereof is equal to or lower than the low level voltage (Yes) at step 103, the routine goes to a step 106. If the A/D conversion output thereof is higher than the low level voltage (Hi) (No) at step 103, the routine goes to a step 105. At step 104, a voltage E1 to be outputted to power supply control circuit 24 is at a low (Low) level in the circuit block diagram shown in FIG. 4. That is to say, a power down enable signal is outputted to power supply control circuit 24 and the routine shown in FIG. 2 is returned to step 101. At a step 105, voltage terminal $E_1$ to be outputted to power supply control circuit 24, as shown in FIG. 4, is kept at the high level and the routine is returned to step 101. At step 106, CPU writes a system operation information to EEPROM 27. At step 107, voltage $E_1$ is turned to the low level (Low) in the same way as step 104 and this routine of FIG. 2 is ended.

[A/D Converter Abnormality Detection Control]

Figure 3:
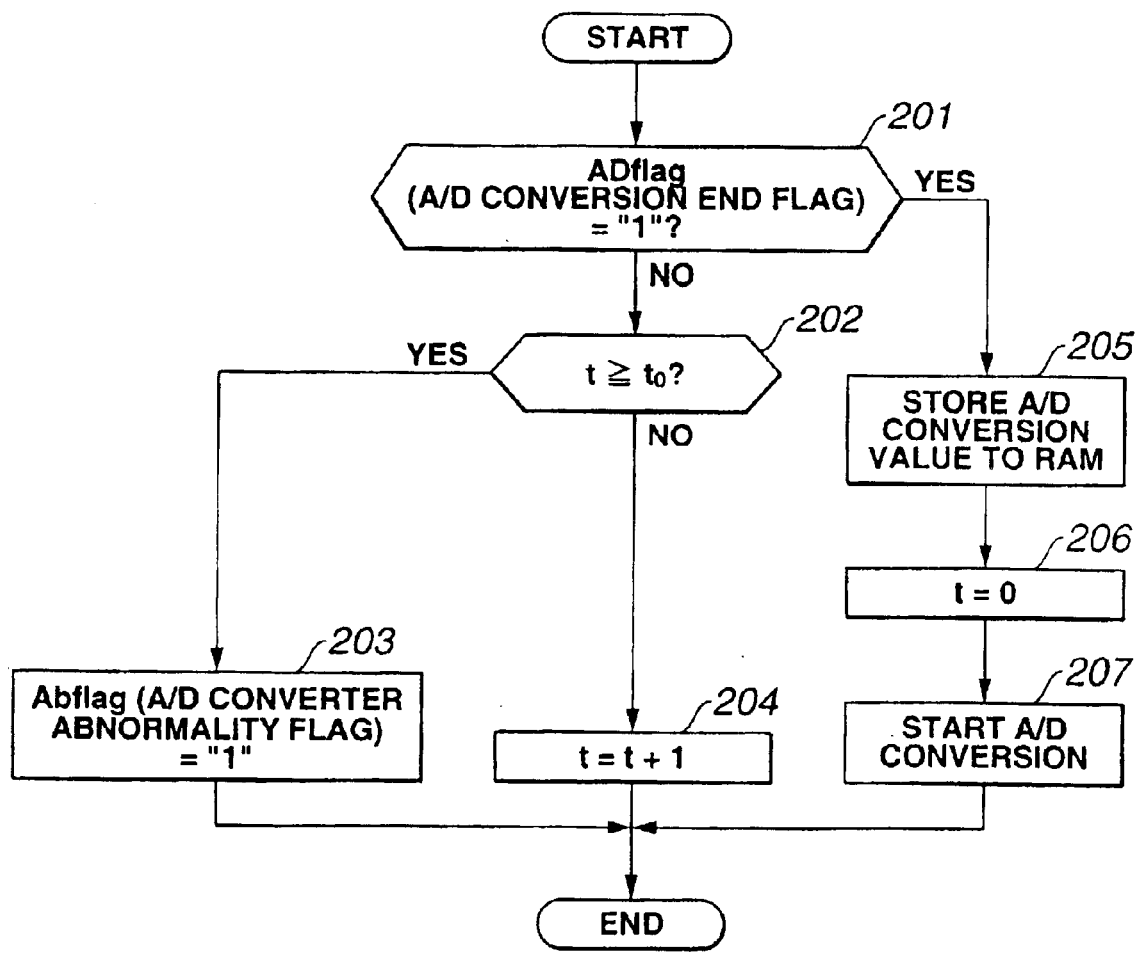
FIG. 3 is an operational flowchart representing a flow of an A/D converter abnormality detection control process in the preferred embodiment according to the present invention.

FIG. 3 shows a flowchart representing an A/D conversion abnormality detection control in CPU 21.

At a step 201, CPU 21 determines whether the A/D conversion has been ended from a state of an A/D conversion end flag ADflag set by the A/D converter installed in CPU 21 when the A/D conversion is actually ended. If ADflag="1" representing that the A/D conversion is ended (Yes) at step 201, the routine goes to a step 205. If the A/D conversion is not ended (No) (ADflag="0") at step 201, the routine shown in FIG. 3 goes to a step 202. At step 202, CPU 21 determines whether a value of a timer t for which a state such that ADflag="0" is continued has reached to a preset time value $t_0$. If $t<t_0$ (No) at step 102, the routine goes to a step 204. If $t \geq t_0$ (Yes), the routine goes to a step 203. At step 203, CPU 21 determines that the abnormality occurs in A/D converter and turns A/D converter abnormality flag Abflag to "1" Then, the routine is ended.

On the other hand, at step 204, timer t is incremented by one and the present routine is ended. At step 205, CPU 21 stores the A/D conversion value into RAM 26. At step 207, CPU 21 outputs a command to start the next A/D conversion to the A/D converter and this routine is ended.

[Abnormality Detection Control of A/D Converter]

When the A/D converter is operated normally, the flow in the case of FIG. 3 is step 201→step 205→step 206, and →step 207.

That is say, when CPU 21 determines that A/D conversion is ended, the A/D conversion value is stored into RAM 26 at step 205. Next, at step 206, the timer t is initialized. At step 207, CPU 21 outputs a command to have the A/D converter start the next A/D conversion and the present control is ended. Once, when the abnormality occurs in the A/D converter, in the flowchart of FIG. 3, the routine repeats the processes of steps of step 201→step 202→ and step 204. In details, at step 201, CPU 21 determines that the A/D conversion is not yet ended at step 202, CPU 21 determines that timer t is shorter than $t_0$, and, at step 204, the timer t is incremented by one. Then, if $t \geq t_0$ (Yes) at step 202, the routine goes from step 202 to step 203. At step 203, CPU 21 determines that the abnormality occurs in A/D converter and an A/D conmverter abnormality flag Abflag is turned to "1" (Abflag=1).

[Gear Shift Control During the A/D Converter Normal Operation]

If the abnormality occurs in the A/D converter, the routine goes from step 101→step 102→step 104, in the flowchart of FIG. 2. That is to say, at step 102, CPU 21 determines that the abnormality in the A/D converter occurs. At step 104, the power down enable signal is outputted from CPU 21 to power supply control circuit 27 is halted. Then, if ignition key switch 12 is turned off, the power supply to the CPU 21 is interrupted and CPU 21 stops (is turned off) without execution of the shut-off process.

Next, the advantages of the shut-off abnormality detection control apparatus will be described below.

In the self shut-off abnormality detection apparatus in the preferred embodiment according to the present invention, even if the A/D converter has failed, CPU 21 cannot output the power down enable signal to power supply control circuit 24, CPU 21 is halted with ignition key switch 12 turned off. Hence, after ignition key switch 12 is turned off, a rise in the battery power supply can be prevented from occurring.

As described hereinabove, the vehicular control unit with a self shut-down function and an abnormality detection function has been described on the basis of the preferred embodiment thereof. However, the present invention is not limited to this. For example, in the embodiment, ATCU 1 having the self shut-off function has been described. However, the present invention is applicable to an ECU (Engine Control Unit) having the self shut-off function. It is noted that, in FIG. 4, D1 and D2 denotes diodes and the phrases of negatively detects means does not detect.

The entire contents of a Japanese Patent Application No. 2002-124732 (filed in Japan on Apr. 25, 2002) are herein incorporated by reference. Various changes and modification may be made without departing from the sprit and the scope of the present invention which is defined with reference to the following claims.

What is claimed is:

1. A vehicular control unit with a self shut-off function and an abnormality detection function, comprising:
a main power supply voltage detecting section to detect a voltage value of a main power supply;
a self shut-off controlling section that executes a shut-off process upon receipt of a supply of a continuous power supply from a power supply control circuit and, thereafter, stops the supply of the continuous power supply, when the detected voltage value of the main power supply is equal to or lower than a preset value with an ignition key switch turned off, the self shut-off controlling section comprising: an abnormality determining section that determines an abnormality occurs in the main power supply voltage detecting section when the main power supply voltage detecting section negatively detects the voltage value of the main power supply; and a power supply stop command output section that outputs a command to stop the supply of the continuous power supply to the power supply control circuit without an execution of the shut-off process when the abnormality determining section determines that the abnormality occurs in the main power supply voltage detecting section.

2. A vehicular control unit with a self shut-off function and an abnormality detection function as claimed in claim 1, wherein the main power supply voltage detecting section comprises an A/D converter that converts an input voltage of the main power supply at an A/D conversion input to a digital output value and the main power supply voltage detecting section detects the voltage value of the main power supply on the basis of the digital output value from the A/D converter.

3. A vehicular control unit with a self shut-off function and an abnormality detection function as claimed in claim 2, wherein the self shut-off controlling section further comprises an A/D conversion end flag ADflag which is set to "1" when the A/D conversion by the A/D converter is ended, wherein the abnormality determining section determines whether a state of an A/D conversion end flag ADflag which is reset to "0" is continued for a predetermined time period, and wherein the abnormality determining section determines that the abnormality occurs in the A/D converter when determining that the state of the A/D conversion end flag ADflag which is reset to "0" is continued for the predetermined time period.

4. A vehicular control unit with a self shut-off function and an abnormality detection function as claimed in claim 3, wherein the self shut-off controlling section further comprises an A/D converter abnormality flag abflag which is set to "1" when the abnormality occurs in the A/D converter and wherein the abnormality determining section determines that the abnormality in the A/D converter occurs and sets the A/D converter abnormality flag abflag to "1" when the state of the A/D conversion end flag ADflag which is reset to "0" is continued for the predetermined time period.

5. A vehicular control unit with a self shut-off function and an abnormality detection function as claimed in claim 4, wherein the power supply stop command output section outputs the power supply stop command to the power supply control circuit when the A/D converter abnormality flag abflag is set to "1".

6. A vehicular control unit with a self shut-off function and an abnormality detection function as claimed in claim 5, wherein, when the abnormality determining section determines that the A/D converter abnormality flag abflag is reset to "0", the self shut-off controlling section determines whether the A/D conversion input is equal to or lower than a predetermined low level, writes an system operation information into a memory, and outputs the command to stop the supply of the continuous supply to the power supply control circuit when determining that the A/D conversion input is equal to or lower than the predetermined low level.

7. A vehicular control unit with a self shut-off function and an abnormality detection function as claimed in claim 1, wherein the vehicular control unit is a vehicular automatic transmission control unit.

8. A vehicular control unit with a self shut-off function and an abnormality detection function as claimed in claim 1, wherein the main power supply is a battery power supply and the continuous power supply is a battery power supply.

9. A vehicular control unit with a self shut-off function and an abnormality detection function as claimed in claim 6, wherein the memory is an EEPROM.

10. A method applicable to a vehicular control unit with a self shut-off function and an abnormality detection function, the vehicular control unit comprising a main power supply voltage detecting section to detect a voltage value of a main power supply, the method comprising:

executing a shut-off process upon receipt of a supply of a continuous power supply from a power supply control circuit, wherein the supply of the continuous power supply takes place, when the detected voltage value of the main power supply is equal to or lower than a preset value with an ignition key switch turned off;

determining that an abnormality occurs in the main power supply voltage detecting section when the main power supply voltage detecting section negatively detects the voltage value of the main power supply; and outputting a command to stop the supply of the continuous power supply to the power supply control circuit without execution of the shut-off process when determining that the abnormality occurs in the main power supply voltage detecting section.

* * * * *